(12) United States Patent
Sellars et al.

(10) Patent No.: US 10,737,604 B2
(45) Date of Patent: Aug. 11, 2020

(54) GRAB HANDLE ASSEMBLY FOR A VEHICLE

(71) Applicant: Honda Motor Co., Ltd., Tokyo (JP)

(72) Inventors: Daniel T. Sellars, West Liberty, OH (US); Michael J. Hokes, Dublin, OH (US); Shinichi Karube, Shiki (JP)

(73) Assignee: Honda Motor Co., Ltd., Tokyo (JP)

( * ) Notice: Subject to any disclaimer, the term of this patent is extended or adjusted under 35 U.S.C. 154(b) by 113 days.

(21) Appl. No.: 16/117,301

(22) Filed: Aug. 30, 2018

(65) Prior Publication Data

US 2020/0070706 A1 Mar. 5, 2020

(51) Int. Cl.
*B60N 3/02* (2006.01)

(52) U.S. Cl.
CPC .................... *B60N 3/026* (2013.01)

(58) Field of Classification Search
CPC .......... B60N 3/026; B60N 3/02; B60N 3/023; F16M 2200/022; Y10T 403/32467; Y10T 403/32475; Y10T 403/32501
See application file for complete search history.

(56) References Cited

U.S. PATENT DOCUMENTS

| | | | | |
|---|---|---|---|---|
| 3,436,984 A | * | 4/1969 | Suddarth | B24B 13/02 74/528 |
| 3,553,843 A | * | 1/1971 | Sophinos et al. | F41G 1/48 42/138 |
| 4,922,698 A | * | 5/1990 | Taylor | A01D 34/733 56/17.5 |
| 5,330,147 A | * | 7/1994 | Volcheff | A47B 21/0314 248/231.41 |
| 8,998,253 B2 | | 4/2015 | Novotny et al. | |
| 9,776,481 B2 | | 10/2017 | Deckard et al. | |
| 9,809,102 B2 | | 11/2017 | Sunsdahl et al. | |
| 9,973,056 B2 | * | 5/2018 | Copanas | H02K 5/26 |
| 2002/0093161 A1 | | 7/2002 | Udwin et al. | |
| 2006/0290097 A1 | * | 12/2006 | Kawamura | B62K 25/283 280/288 |
| 2014/0103627 A1 | | 4/2014 | Deckard et al. | |
| 2015/0210341 A1 | * | 7/2015 | Chen | B62J 1/08 297/215.13 |
| 2019/0329688 A1 | * | 10/2019 | Nakamura | B60N 3/026 |

* cited by examiner

*Primary Examiner* — Victor D Batson
*Assistant Examiner* — Matthew J Sullivan
(74) *Attorney, Agent, or Firm* — Honda Patents & Technologies North America, LLC; Clifford B Vaterlaus (57) ABSTRACT

A grab handle assembly for a vehicle includes a sleeve for attaching to the vehicle, an insert receivable in the sleeve, and a grab handle positioned on an end of the insert. A locking member is provided to adjustably fix a position of the grab handle with respect to the sleeve. The locking member includes a locking pin and a cam lock mechanism to hold the insert with respect to the sleeve. A rotation prevention surface may be provided on the locking pin to prevent the locking pin from rotating with respect to the sleeve and the insert. A locking force provided by the locking member may be preset.

18 Claims, 5 Drawing Sheets

GRAB HANDLE ASSEMBLY FOR A VEHICLE

BACKGROUND

The disclosed subject matter relates to vehicle components. More particularly, the disclosed subject matter relates to grab handle assemblies for use by passengers in the vehicle to provide stability for the passengers, particularly when driving in rough conditions.

Vehicles driven off-road are commonly subjected to rough conditions that may jostle the occupants of the vehicle. Drivers of the vehicles may be less impacted by the rough conditions than passengers, because drivers can hold on to the steering wheel to remain stable. Moreover, drivers may be able to anticipate movements of the vehicle better since they are operating the vehicle. However, rough road conditions may make it beneficial to provide grab handles for vehicle passengers to hold for better stability.

Some grab handles may be non-adjustably fixed in place such that their position may not be comfortable for some passengers. Other grab handles may be provided that are adjustable. However, tolerances between mating parts of the known adjustable grab handles provide a loose connection between the parts such that the grab handles rattle during operation of the vehicle. Yet other adjustable grab handles may be difficult to adjust, requiring tools or excessive time for a passenger to figure out how to adjust the handles. Moreover, some adjustable grab handles provide only a limited number of adjustable positions such that achieving a desired position may be impossible to accomplish. Some of the adjustment mechanisms may be separated from the grab handles such that they may be dropped while adjusting the position, making it even more difficult to adjust while riding in the vehicle. Still other grab handles known in the art have fixed collapsing properties. Such grab handles cannot be adjusted to yield under predetermined conditions, and when they do yield, the grab handles are permanently deformed.

It would therefore be desirable to provide a grab handle assembly for a vehicle that is intuitive and simple to adjust. It would also be desirable to provide a grab handle assembly that can be adjusted without allowing the grab handle to rattle during operation of the vehicle. Additionally, it would be desirable to provide a grab handle assembly with an adjustment mechanism that remains attached as the grab handle is adjusted so that the adjustment mechanism avoids being dropped during the adjustment process. It would also be desirable to provide a grab handle that is adjustable to an infinite number of positions. Furthermore, it would be desirable to provide a grab handle assembly that is adjustable to allow the grab handle to withstand a predetermined load before collapsing, and yet allow the grab handle to collapse to absorb energy without permanently deforming or damaging the grab handle assembly.

SUMMARY

In accordance with one embodiment of the present disclosure, a grab handle assembly for a vehicle includes a sleeve for attaching to the vehicle, an insert receivable in the sleeve, a handle disposed on the insert, and a locking member for fixing the insert with respect to the sleeve. The locking member has a locking pin receivable within the sleeve. The locking pin has a proximal end portion and a distal end portion, and a lock handle disposed on the proximal end portion. The lock handle is rotatable with respect to the locking pin to lock the locking member. An adjustment mechanism is disposed on the distal end portion of the locking pin. The adjustment mechanism is configured for adjusting a locking force of the locking member. A cover is provided on the distal end portion of the locking pin for covering the adjustment mechanism.

In accordance with another embodiment of the present disclosure, a grab handle assembly for a vehicle includes a sleeve for attaching to the vehicle, an insert receivable in the sleeve, a handle disposed on the insert, and a locking member for fixing the insert with respect to the sleeve. The locking member has a locking pin receivable within the sleeve. The locking pin has a proximal end portion and a distal end portion and a rotation prevention surface disposed between the proximal end portion and the distal end portion for preventing the locking pin from rotating with respect to at least one of the insert and the sleeve.

In accordance with yet a further embodiment of the present disclosure, a grab handle assembly for a vehicle includes a sleeve for attaching to the vehicle, an insert receivable in the sleeve, a handle disposed on the insert, and a locking member for fixing the insert with respect to the sleeve. The locking member is adjustable to provide a pre-determined locking force to maintain the handle in a fixed position with respect to the sleeve until a release force is applied that exceeds the pre-determined locking force.

BRIEF DESCRIPTION OF THE DRAWINGS

Certain embodiments of the present disclosure will be better understood from the following description taken in conjunction with the accompanying drawings in which.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-6, wherein like numbers indicate the same or corresponding elements throughout the views.

Figure 1:
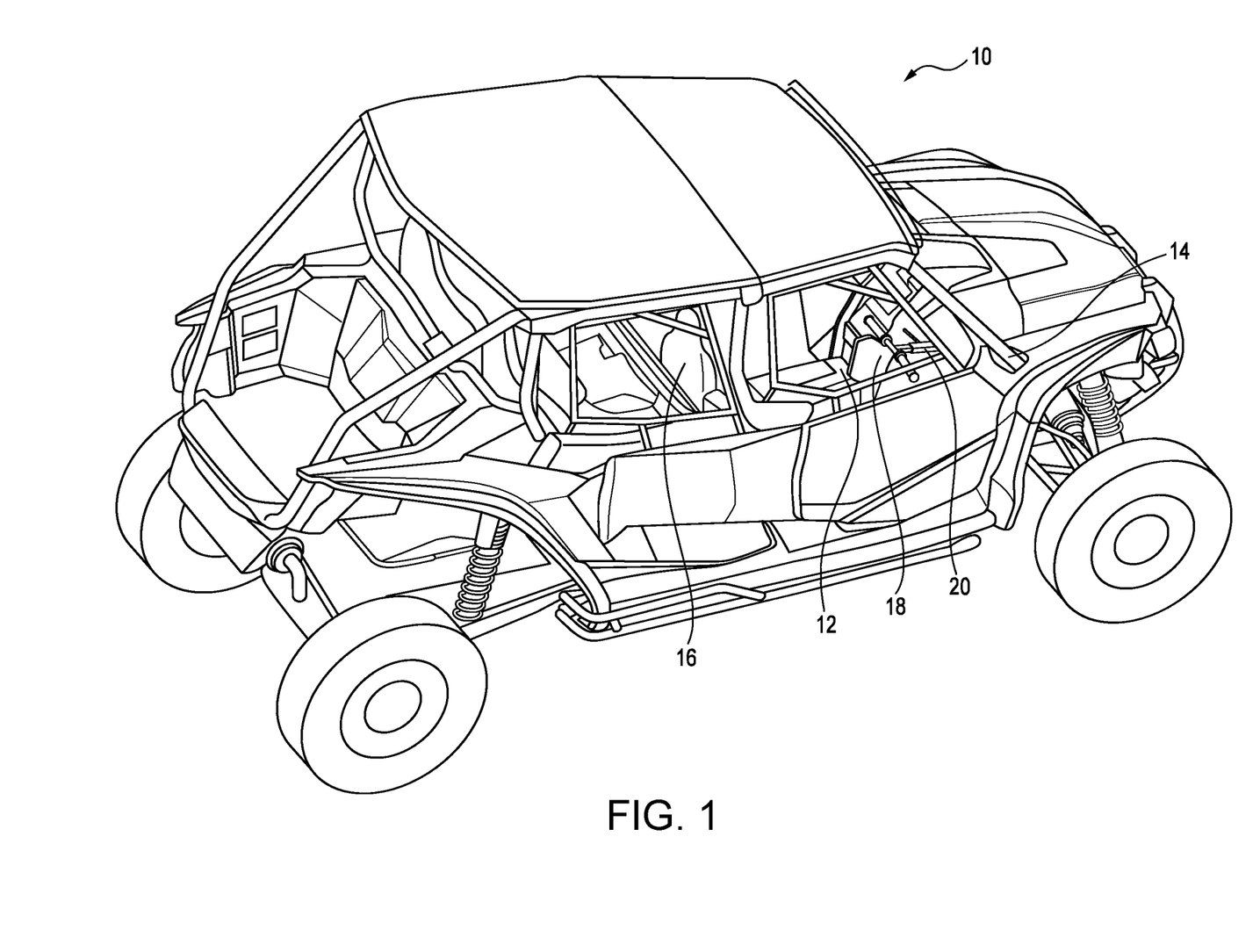
FIG. 1 is a perspective view depicting a vehicle having a grab handle assembly in accordance with one embodiment of the present disclosure.

FIG. 1 illustrates a perspective view of a vehicle, indicated generally at 10, in accordance with one embodiment of the present disclosure. The vehicle 10 is shown as an off-road vehicle capable of operating on rough terrain. However, principles of the present disclosure are useful with various other kinds of vehicles, including automobiles, trucks, vans, recreational vehicles, amusement ride vehicles, utility vehicles, agricultural equipment, or construction equipment, and the like.

The vehicle 10 may include an occupant space 12 for one or more occupants of the vehicle 10. The occupant space 12 may be at least partially defined by a frame 14. In one embodiment, the frame 14 may include a roll protection structure that may be particularly useful in off-road vehicles. The vehicle 10 may also include one or more seats 16 for the occupants of the vehicle 10. It will be appreciated that the seats 16 may be arranged in any manner, and may include bench seats or bucket seats to provide seating surfaces for occupants of the vehicle 10. The seats 16 may be arranged in a side-by-side configuration, and may be arranged in a single row or multiple rows within the scope of the present disclosure.

The vehicle 10 may also include a dash 18 positioned in front of the seats 16. The dash 18 may be supported by portions of the vehicle frame 14 in a manner known to those skilled in the art. A grab handle assembly 20 may be provided in the area of the dash 18 for providing a structure for a passenger of the vehicle 10 to grasp to allow the passenger to remain stable in the seat 16 when the vehicle 10 is operating under rough conditions. The grab handle assembly 20 may be supported by the frame 14 or the dash 18 in a manner described in greater detail below. It will be understood that alternative embodiments of a vehicle 10 may be provided without a dash 18 in accordance with the principles of the present disclosure.

Figure 2:
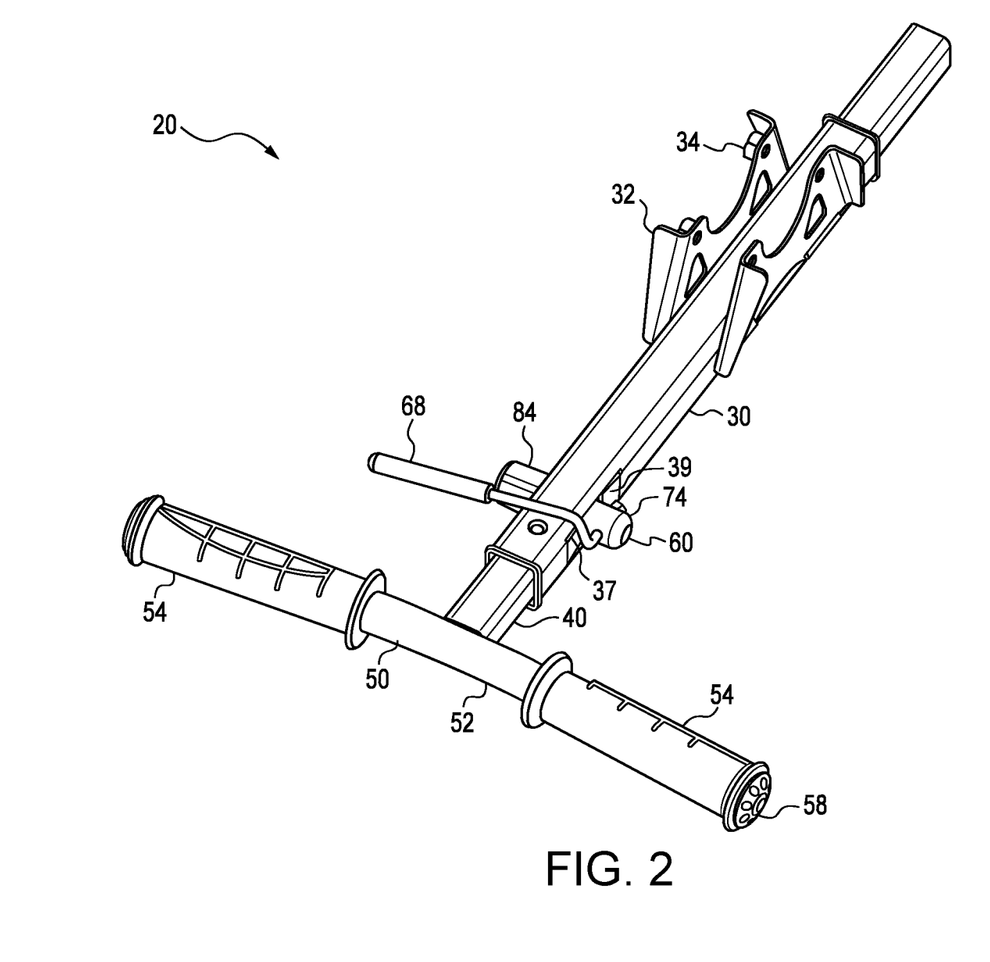
FIG. 2 is a perspective view of a grab handle assembly in accordance with one embodiment of the present disclosure with a locking member in a locked position.
Figure 3:
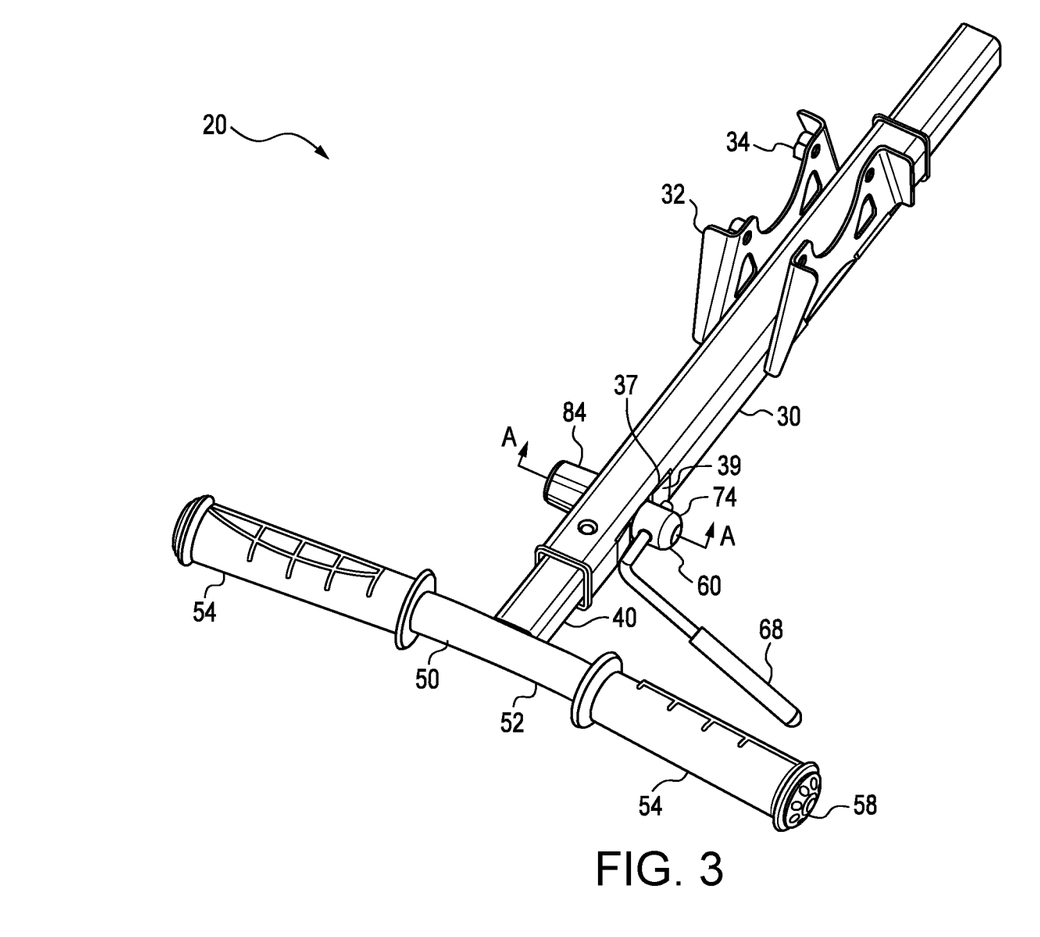
FIG. 3 is a perspective view of the grab handle assembly of FIG. 2 with the locking member in an unlocked position.

Referring now to FIG. 2, a perspective view of one embodiment of the grab handle assembly 20 is shown in accordance with the principles of the present disclosure. The grab handle assembly 20 may include a sleeve 30, an insert 40 receivable in the sleeve 30, a handle 50 disposed on the insert 40, and a locking member 60 for fixing the insert 40 with respect to the sleeve 30. The locking member 60 is shown in a locked position in FIG. 2, whereas FIG. 3 depicts a perspective view of the grab handle assembly 20 with the locking member 60 in an unlocked position.

Figure 4:
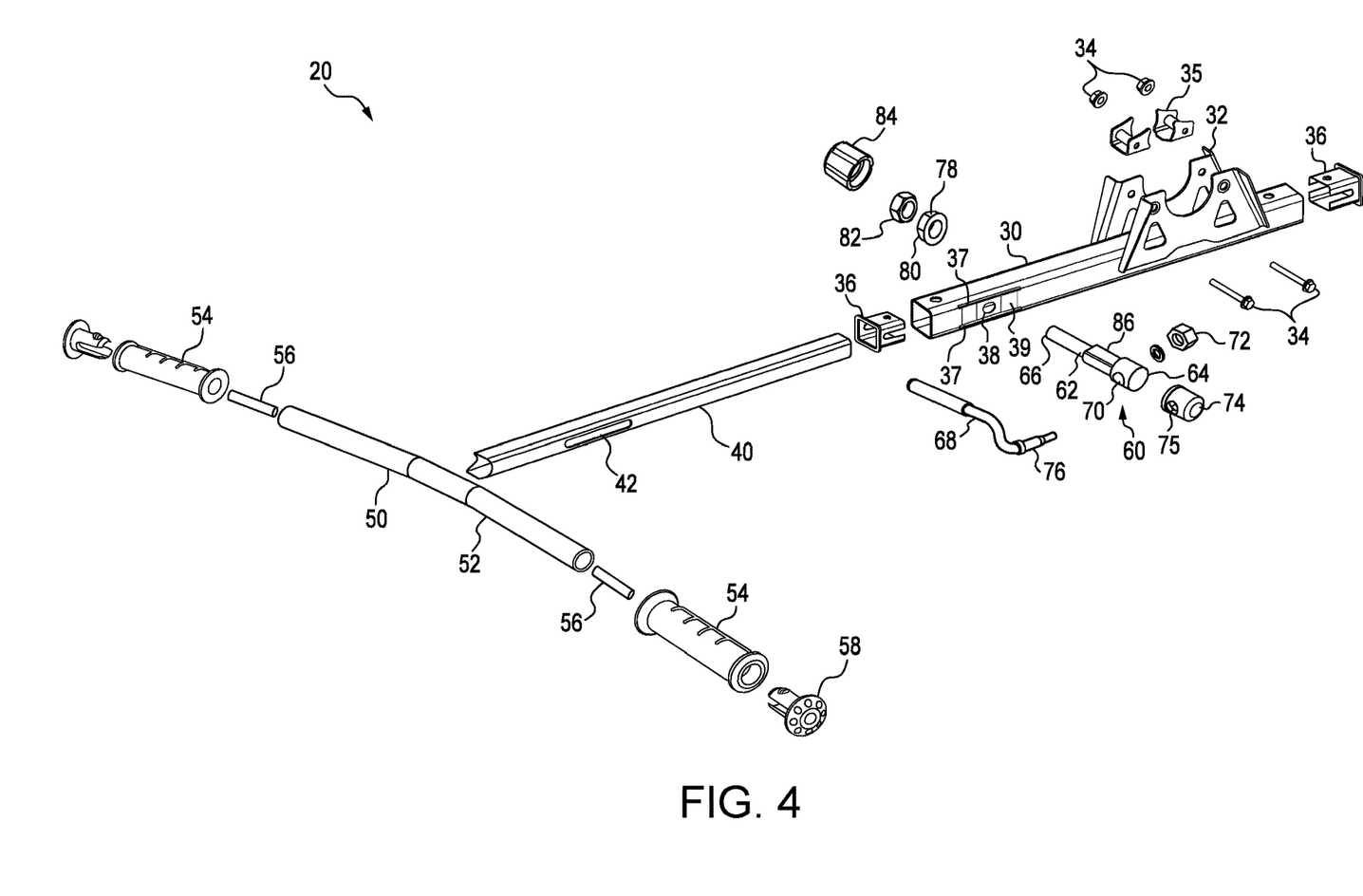
FIG. 4 is an exploded view of one embodiment of a grab handle assembly in accordance with the concepts of the present disclosure.

Additional details of the grab handle assembly 20 are described with reference to FIG. 4, which depicts an exploded view of an embodiment of the grab handle assembly 20. The sleeve 30 may include a tubular member having any suitable cross-sectional shape. For example the sleeve 30 may be hollow with sidewalls forming a square cross-sectional shape for receiving the insert 40 therein. Alternatively, the sleeve 30 may have any other suitable cross-sectional shape, such as round or polygonal, or an open shape such as a channel. Accordingly, the sleeve 30 may be configured to receive the insert 40 to allow the insert 40 to slide or telescope with respect to the sleeve 30.

A bracket 32 may be provided to attach the sleeve 30 to the dash 18 or the frame 14 of the vehicle 10. In one embodiment, the bracket 32 may be welded to the sleeve 30. Alternatively, fasteners may be used to attach the bracket 32 to the sleeve 30. Also, bracket fasteners 34 may be used to attach the bracket 32 to the dash 18. The bracket fasteners 34 may be any suitable fasteners, such as bolts and nuts, screws, rivets, clips, or the like. Spacers 35 may also optionally be used with the bracket 32 and bracket fasteners 34 to hold the sleeve 30 in the desired position. Alternatively, the sleeve 30 may be attached directly to the frame 14 or an intervening part directly without the bracket 32 using welding, adhesives or the like. Sleeve caps 36 may be provided to close the ends of the sleeve 30 or to provide a more aesthetically pleasing appearance, to protect sharp edges, and/or to provide a tight fit between the sleeve 30 and the insert 40 to assist in preventing rattling. A sleeve opening 38 may be provided on opposing sides of the sleeve 30 for receiving the locking member 60 in a direction transverse to the longitudinal direction of the sleeve 30.

A recess 39 may also be provided in the side of the sleeve 30 surrounding the sleeve opening 38. The recess 39 may facilitate positioning the locking member 60 in alignment with the sleeve opening 38 and holding the locking member 60 in the proper position during use. Moreover, the recess 39 may form a portion of the sleeve 30 to deflect to adjustably attach the insert 40 to the sleeve 30. One or more slits 37 may be placed in the sleeve 30 to facilitate formation of the recess 39. In the embodiment shown, two slits 37 are formed in the sleeve 30, one on an upper portion of the recess 39, and another on a lower portion of the recess 39. Accordingly, the recess 39 may extend a length of the slits 37, and between the slits 37. The slits 37 allow the area surrounding the sleeve opening 38 to move with respect to the other portions of the sleeve 30 when the locking member 60 is adjusted. Thus, the locking member 60 can move the portion of the sleeve 30 defining the recess 39 to releasably contact the insert 40. It will be understood that alternative embodiments of the sleeve 30 may be formed without the slits or recesses, with different shaped slits or recesses, or with different quantities of slits or recesses.

The insert 40 may be sized and shaped to be slidingly received within the sleeve 30. Accordingly, in the embodiment shown, the insert 40 may be formed with sidewalls defining a square cross-sectional shape to fit within the sleeve 30. The insert 40 may have an adjustment opening 42 on opposing sides of the sleeve 30 for receiving the locking member 60. In the embodiment shown, the adjustment opening 42 is an elongated slot with a length extending in the longitudinal direction of the insert 40. The adjustment opening 42 in the shape of an elongated slot can allow adjustment of the locking member 60 in any of an infinite number of positions along the length of the adjustment opening 42.

The handle 50 may include a bar 52 that may be fixed on an end of the insert 40 by means of welding, fasteners or any other suitable connection mechanism known to those skilled in the art. Alternatively, the bar 52 and the insert 40 may be formed of a one piece unitary member. In the embodiment shown, the handle 50 and the insert 40 may form a substantial "T" shape. However, it will be understood that handles of other shapes, such as loops, may be used within the scope of the present disclosure.

The handle 50 may include grips 54 on the ends of the bar 52 for allowing the vehicle passenger to comfortably grip the handle 50. An adhesive member 56 may be used to fasten the grips 54 to the bar 52. Other embodiments of the grips 54 may be attached to the bar 52 by a press-fit between the grips 54 and the bar 52, or by other fasteners known in the art. Handle plugs 58 may be inserted in the ends of the grips 54 to fill the ends of the grips 54 and provide a more aesthetically pleasing appearance. It will be understood however, that alternate embodiments of the grips 54 may be provided without the handle plugs 58 within the scope of the present disclosure.

The locking member 60 may include a locking pin 62 receivable within the sleeve 30 through the sleeve openings 38, and through the insert 40 via the adjustment openings 42. When the locking pin 62 is installed in the sleeve 30 and the insert 40, the locking pin 62 extends in a direction transverse to the longitudinal direction of the sleeve 30 and the insert 40. The locking pin 62 includes a proximal end portion 64 and a distal end portion 66. A lock handle 68 may be disposed on the proximal end portion 64. The lock handle 68 may extend through an opening 70 in the proximal end portion 64 of the locking pin 62, and may be attached to the proximal end portion 64 using a handle fastener 72, such as a nut, pin, or the like. The lock handle 68 may also extend through a cap 74 via a cap opening 75 aligned with the opening 70 in the proximal end portion 64 of the locking pin 62. The lock handle 68 may include a cam 76 that contacts an interior surface of the proximal end portion 64 of the locking pin 62 that defines the opening 70 to thereby move the locking pin 62 with respect to the cap 74 to create a locking force, described in more detail below. It will be appreciated that such a locking mechanism using a cam is sometimes referred to as a cam lock.

Figure 5:
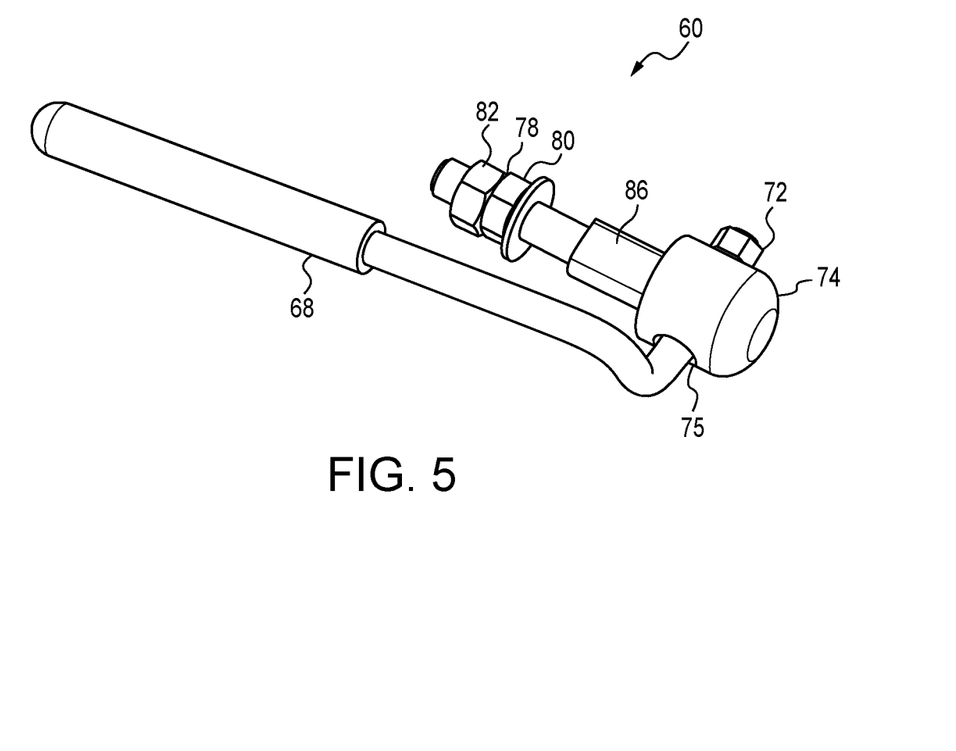
FIG. 5 is a perspective view of one embodiment of a locking member of the grab handle assembly.

The distal end portion 66 of the locking pin 62 may include an adjustment mechanism 78 for adjusting a length of the locking pin 62 receivable within the sleeve 30. The adjustment mechanism 78 may include a pair of nuts that may be threadably engaged with the distal end portion 66 of the locking pin 62, as shown in FIG. 5. A proximal most nut, or first nut 80 may be adjusted to engage a sidewall of the sleeve 30, and a distal most nut, or second nut 82 may be adjusted to hold the first nut 80 in place. Alternative embodiments of the adjustment mechanism 78 may include a single nut, a clip, or the like.

A cover 84 may be provided over the adjustment mechanism 78. The cover 84 is shown in FIGS. 2-4, but has been removed in the view of the locking member 60 in FIG. 5 to better illustrate the adjustment mechanism 78. The cover 84 serves various purposes. For example, the cover 84 hides the adjustment mechanism 78 from view so that the vehicle occupants do not see the adjustment mechanism 78 and mistakenly determine that manipulation of the adjustment mechanism 78 is necessary to operate the locking member 60 under normal circumstances. Additionally, the cover 84 provides protection to the adjustment mechanism 78 from water, dirt and debris that are commonly encountered during operation of off-road vehicles. Furthermore, the cover 84 provides an improved finished appearance to the locking member 60.

The locking pin 62 may also include a rotation prevention surface 86. The rotation prevention surface 86 may be located between the proximal end portion 64 and the distal end portion 66 of the locking pin 62 at a location receivable within the sleeve 30 and the insert 40. The rotation prevention surface 86 may be formed as a flat surface on the locking pin 62. One embodiment of the rotation prevention surface 86 may be a flat surface formed on an otherwise rounded cross-sectional shape. Alternatively, the rotation prevention surface 86 may be a side of a polygonal shape when viewed in cross-section, such as a side of a square, or a hexagon, for example. It will be understood however, that the rotation prevention surface 86 may be formed of various different shapes within the scope of the present disclosure. The rotation prevention surface 86 may be configured to be received within the adjustment opening 42 of the insert 40 in a manner that contacts the sidewall defining the adjustment opening 42 along a length of the adjustment opening 42 to prevent the locking pin 62 from rotating within the adjustment opening 42. Accordingly, once the locking pin 62 is received in the insert 40 the locking member 60 does not rotate to a position in which the lock handle 68 may be difficult to see or operate. The lock handle 68 can therefore be positioned at a predetermined location such that the lock handle 68 remains as desired throughout operation of the locking member 60. For example, the lock handle 68 may be positioned over an upper surface of the sleeve 30 as shown in FIG. 2, to be visible by the passenger and to be operable to move to a position as shown in FIG. 3 without interference by the sleeve 30, the dash 18, or some other vehicle component. Thus the rotation prevention surface 86 assists in providing a locking member 60 that is easy and intuitive for the passenger to operate.

It will be understood that alternative embodiments of the present disclosure may include an elongated slot on the sleeve 30 rather than on the insert 40. In such configuration, the rotation prevention surface 86 may contact the sidewall of the sleeve 30 rather than the insert 40. Moreover, alternative embodiments of the rotation prevention surface 86 may be formed as projections or detents extending from the locking pin 62 that engage with features on at least one of the sleeve 30 or insert 40 to prevent rotation of the locking pin 62 with respect to at least one of the insert 40 and the sleeve 30.

Figure 6:
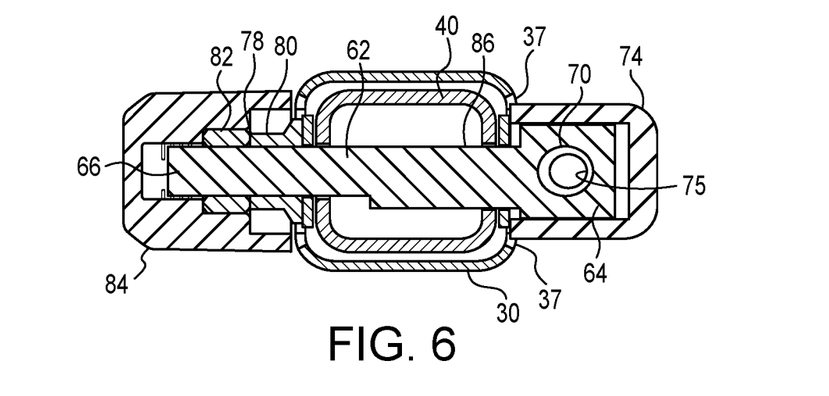
FIG. 6 is a cross-sectional view of a portion of the grab handle assembly taken along line A-A in FIG. 3.

Operation of the locking member 60 will now be described with reference to FIGS. 1-6. FIG. 6 depicts a cross-sectional view of a portion of the grab handle assembly 20 taken along line A-A in FIG. 3, with the lock handle 68 removed. The locking pin 62 is inserted through the sleeve openings 38 in the sleeve 30 and the adjustment opening 42 in the insert 40. The lock handle 68 is positioned in an unlocked position as shown in FIG. 3. The first nut 80 is tightened on the locking pin 62 to contact a side of the sleeve 30 while the cap 74 contacts an opposite side of the sleeve 30. The second nut 82 is tightened to the first nut 80 to hold the first nut 80 in position. The cover 84 may then be attached over the adjustment mechanism 78 on the distal end portion 66 of the locking pin 62. The lock handle 68 may then be rotated to the position as shown in FIG. 2. While rotating the lock handle 68 to such position, the cam 76 contacts the interior surface of the locking pin 62 defining the opening 70 and thereby forces the locking pin 62 deeper within the cap 74 in a direction toward the proximal end portion 64 (to the right in FIG. 6). Accordingly, the sleeve 30 is compressed between the first nut 80 and the cap 74 as the locking pin 62 moves deeper within the cap 74. The compression of the sleeve 30 causes the sidewalls of the sleeve 30 in the recess 39 to deflect to grip the insert 40 and thereby hold the insert 40 with respect to the sleeve 30.

To adjust the position of the handle 50, the lock handle 68 can be rotated to a position as shown in FIG. 3, which releases the compression between the first nut 80 and the cap 74. The handle 50 and the insert 40 can then slide with respect to the sleeve 30 so that the locking pin 62 slides along the length of the adjustment opening 42 in the insert 40. The specific position of the handle 50 and the insert 40 can be selected from any of an infinite number of positions of the locking pin 62 within the adjustment opening 42. Once the desired position of the handle 50 is achieved, the lock handle 68 can be rotated to the position as shown in FIG. 2 to lock the handle 50 in place. Once the insert 40 is locked to the sleeve 30, there is no loose gap between the parts at the locking member 60 to allow the parts to move with respect to each other and cause a rattling noise. Accordingly, the grab handle assembly 20 can operate quietly even while driving the vehicle 10 over rough terrain.

Another advantage of the present arrangement is that the locking force achieved by the locking member 60 can be predetermined and set in the factory as the grab handle assembly 20 is assembled. This allows the locking member 60 to be set at a condition that provides a predetermined locking force so that the locking member 60 can be set to hold the handle 50 in position during normal use of the vehicle 10. Moreover, the locking member 60 can be set at a predetermined force such that the holding force will allow movement of the insert 40 with respect to the sleeve 30 under higher force conditions. Accordingly, the grab handle assembly 20 may be configured to collapse and absorb energy under higher load conditions, such as loads that might occur in a collision. In some load conditions, the insert 40 may be configured to slide with respect to the sleeve 30 to absorb energy without deforming or damaging components of the grab handle assembly 20. The grab handle assembly 20 could therefore be readjusted without replacing parts.

In one embodiment, the locking force may be set in the factory to provide a locking force of between approximately 1,500 and 2,500 N. This may be accomplished by establishing a position to which the adjustment mechanism 78 is to be set. In one embodiment, a torque may be determined to which the first nut 80 is to be tightened to accomplish the proper locking force when the lock handle 68 is tightened. A torque wrench may be used in the factory to tighten the first nut 80 to achieve the proper locking force. Alternatively, visual indicators may be placed on the locking pin 62 to establish a location of the first nut 80. Accordingly, once the grab handle assembly 20 is assembled at the factory, the passenger need only rotate the lock handle 68 to achieve the proper locking force.

By placing the cover 84 over the adjustment mechanism 78, occupants of the vehicle 10 are less likely to see and tamper with the adjustment mechanism 78 so that unneeded adjustments may be avoided. Moreover, once the locking member 60 is installed, the locking member 60 does not need to be separated from the sleeve 30 and the insert 40 to adjust the position of the grab handle 50. In contrast, prior art mechanisms with a removable pin have the drawback that if adjustment is attempted during operation of the vehicle, particularly in rough terrain, the pin may be dropped. Similarly, the pin may be misplaced or it may be difficult to position the pin in the proper location to achieve locking while the vehicle is in motion.

It will be understood that the concepts of the present disclosure provide a grab handle assembly 20 that is easy and intuitive to adjust and operate. The locking member 60 is consistently positioned at a location where it can be visible and operated without interference. Moreover, the locking member 60 remains attached as the grab handle assembly 20 is adjusted, thereby preventing the locking member 60 from being dropped during adjustment. The grab handle assembly 20 is arranged in a manner that avoids rattling noises even when subjected to vibrations caused by riding the vehicle 10 on bumpy or off-road conditions. Moreover, the principles of the present disclosure provide a grab handle assembly 20 that can be set to remain at a desired position during customary driving conditions, and the grab handle assembly 20 can collapse during higher load conditions to absorb energy without damage.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A grab handle assembly for a vehicle comprising:
a sleeve for attaching to the vehicle;
an insert receivable in the sleeve;
a handle disposed on the insert; and
a locking member for fixing the insert with respect to the sleeve, the locking member having a locking pin receivable within the sleeve, the locking pin having a proximal end portion and a distal end portion, a lock handle disposed on the proximal end portion, the lock handle rotatable with respect to the locking pin to lock the locking member, an adjustment mechanism disposed on the distal end portion of the locking pin, the adjustment mechanism configured for adjusting a locking force of the locking member, and a cover on the distal end portion of the locking pin for covering the adjustment mechanism, the cover defining an interior space for removably receiving the distal end portion of the locking pin and the adjustment mechanism therein;
wherein the proximal end portion of the locking pin has an opening, and wherein the lock handle comprises a cam that is disposed in the opening for moving the locking pin when the lock handle is rotated to fix the insert with respect to the sleeve.

2. The grab handle assembly of claim 1, wherein the insert comprises a slot that is elongated in a longitudinal direction of the insert for receiving the locking pin therethrough.

3. The grab handle assembly of claim 2, wherein the locking pin comprises a flat surface between the proximal end portion and the distal end portion, the flat surface contacting the insert within the slot to thereby prevent the locking pin from rotating with respect to the insert.

4. The grab handle assembly of claim 1, wherein the sleeve comprises an opening for receiving the locking pin, and a recess surrounding the opening for positioning the locking member.

5. The grab handle assembly of claim 1, wherein the adjustment mechanism comprises a first nut and a second nut.

6. The grab handle assembly of claim 1, further comprising a cap disposed on the proximal end portion, the lock handle rotatable with respect to the locking pin and the cap to lock the locking member.

7. The grab handle assembly of claim 1, wherein the handle and the insert together form a substantial "T" shape.

8. The grab handle assembly of claim 6, further comprising a rotation prevention surface that holds the locking pin such that the opening in the locking pin extends in a direction substantially parallel to the sleeve so that when the locking member is in a locked position a portion of the lock handle is positioned over an upper surface of the sleeve so as to be visible to a passenger of the vehicle to indicate that the locking member is in the locked position.

9. A grab handle assembly for a vehicle comprising:
a sleeve for attaching to the vehicle;
an insert receivable in the sleeve;
a handle disposed on the insert; and
a locking member for fixing the insert with respect to the sleeve, the locking member having a locking pin receivable within the sleeve, the locking pin having a proximal end portion and a distal end portion and a rotation prevention surface disposed between the proximal end portion and the distal end portion for preventing the locking pin from rotating with respect to at least one of the insert and the sleeve;

wherein the proximal end portion of the locking pin has an opening, and the locking member comprises a lock handle having a cam portion, and wherein the cam portion is disposed in the opening in the locking pin.

10. The grab handle assembly of claim 9, wherein the insert comprises a slot that is elongated in a longitudinal direction of the insert for receiving the locking pin therethrough.

11. The grab handle assembly of claim 10, wherein the rotation prevention surface comprises a flat surface that contacts a sidewall of the insert within the slot to thereby prevent the locking pin from rotating with respect to the insert.

12. The grab handle assembly of claim 9, wherein the locking member comprises a cover over the distal end portion of the pin.

13. The grab handle assembly of claim 9 wherein when the locking member is in a locked position, a portion of the lock handle is positioned over an upper surface of the sleeve so as to be visible to a passenger of the vehicle to indicate that the locking member is in the locked position.

14. A grab handle assembly for a vehicle comprising:
a sleeve for attaching to the vehicle;
an insert receivable in the sleeve;
a handle disposed on the insert; and
a locking member for fixing the insert with respect to the sleeve;
wherein the locking member is adjustable to provide a pre-determined locking force to maintain the handle in a fixed position with respect to the sleeve until a release force is applied that exceeds the pre-determined locking force;
wherein the locking member comprises a locking pin receivable within the sleeve, the locking pin having a proximal end portion and a distal end portion, a cap and a lock handle disposed on the proximal end portion, the lock handle rotatable with respect to the locking pin and the cap to lock the locking member, and an adjustment mechanism disposed on the distal end portion of the locking pin;
wherein the adjustment mechanism is configured for adjusting the locking member to provide the pre-determined locking force, and wherein the proximal end portion of the locking pin has an opening, and the lock handle has a cam portion, and wherein the cam portion is disposed in the opening in the locking pin.

15. The grab handle assembly of claim 14, wherein the adjustment mechanism comprises a nut threadably engageable on the distal end portion of the locking pin.

16. The grab handle assembly of claim 14, wherein the locking member further comprises a cover on the distal end portion of the locking pin for covering the adjustment mechanism.

17. The grab handle assembly of claim 14, wherein the predetermined locking force is between 1,500 and 2,500 N.

18. The grab handle assembly of claim 13, wherein the rotation prevention surface holds the locking pin such that the opening in the locking pin extends in a direction substantially parallel to the sleeve, and wherein the lock handle rotates about the cam portion of the lock handle in the opening.

* * * * *